(12) United States Patent
Orta-Castro et al.

(10) Patent No.: US 6,398,840 B1
(45) Date of Patent: Jun. 4, 2002

(54) PROCESS FOR TREATING SLUDGE

(76) Inventors: Pedro Orta-Castro, Rio Missouri #326 Ote., Colonia del Valle, Garza Garcia, Nuevo León (MX), 66220; José Cabello-Fuentes, Calle 8 Lote 3ᵃ Manzana 26, Colonia Petrolera, Minatitlán, Veracruz (MX), 96850

( * ) Notice: Subject to any disclaimer, the term of this patent is extended or adjusted under 35 U.S.C. 154(b) by 0 days.

(21) Appl. No.: 09/590,766

(22) Filed: Jun. 8, 2000

(51) Int. Cl.⁷ .................................................. C05F 7/00
(52) U.S. Cl. .................. 71/12; 71/13; 71/21; 71/22; 71/28; 71/29; 210/609; 210/631; 210/710; 210/725; 210/764; 210/768; 210/770; 210/916
(58) Field of Search .................. 71/11, 12, 13, 71/15, 21, 22, 28, 29; 210/609, 631, 710, 724, 725, 768, 770, 764, 916

(56) References Cited

U.S. PATENT DOCUMENTS

| | | | | |
|---|---|---|---|---|
| 2,723,954 A | * | 11/1955 | Young .......................... | 210/770 |
| 3,351,455 A | * | 11/1967 | Burns ........................... | 71/61 |
| 5,411,568 A | * | 5/1995 | Moore .......................... | 71/22 |
| 5,422,015 A | * | 6/1995 | Angell et al. ................ | 210/764 |
| 5,428,906 A | * | 7/1995 | Lynam et al. ................ | 210/770 |
| 5,443,613 A | * | 8/1995 | Robinson ..................... | 71/12 |
| 5,466,273 A | * | 11/1995 | Connell ........................ | 71/11 |
| 5,976,211 A | * | 11/1999 | Fjelldal et al. ................ | 71/11 |
| 5,984,992 A | * | 11/1999 | Greer et al. .................. | 71/11 |

* cited by examiner

Primary Examiner—Peter A. Hruskoci
(74) Attorney, Agent, or Firm—Abelman, Frayne & Schwab

(57) ABSTRACT

A process for treating sludge comprising the addition of sulphuric acid and anhydrous ammonium to the sludge inside a granulator in order to produce an exothermic reaction which generates sufficient heat to evaporate the water contained in the sludge, thus eliminating all the pathogen and non pathogen microorganism, and producing a dry product having a low pH, free of polluting agents and a high commercial value.

14 Claims, 1 Drawing Sheet

PROCESS FOR TREATING SLUDGE

BACKGROUND OF THE INVENTION.

This invention relates to processes for the treatment of sludge generated by wastewater treatments, and more particularly to a process for chemically heating and drying sludge by which all pathogen and non pathogen microorganisms are eliminated, obtaining a product which can be used as a good quality fertilizer.

A. FIELD OF THE INVENTION.

In the wastewater treatment processes, it is produced a great quantity of a bio-mass called sludge, normally comprising 98% of water and 2% of solids, which contains a great variety of microorganisms, such as bacteria, parasites and pathogen viruses among others.

Due to the biological content of the sludge, it is highly polluting for the environment and represent a serious health risk for the population.

The disposition of the sludge is a complex and problematic task, which is actually made using the following processes:

a) Land Fill

This process consists on confining the sludge in a field having the following characteristics: a low permeability, absence of geological faults, very low volumes of rainfall, and far away from towns and cities in order to avoid the pollution of the aquiferous layers with possible leaks of polluted liquid from the land fill.

Obviously, before the disposition of the sludge in the field, the surface of the field has to be sealed with a waterproof and flexible plastic film, and after the deposit of each sludge layer, it has to be applied a very thick soil layer.

Among some of the disadvantages of the above referred process are: its high investment cost, its high operation cost and its null economic profit.

b) Pasteurization Process and Compost Production

This process comprises the steps of mixing the sludge with pasture; heating the resultant mix with steam and fast cooling the heated mix in order to eliminate all the pathogen microorganisms contained in the sludge and obtain a fertilizer called Compost free of any bacteriological polluting agent.

However, this process is recommended for using in low capacity wastewater treatment plants, in order to apply the produced Compost to cultivation lands in the proximity of the treatment plant due to the high transportation costs and low selling price of the Compost which make unprofitable the transportation of the Compost to places very far away from the plant.

c) Rotary Dryers

The sludge drying process produces a good quality fertilizer having an average commercial value, due to its high organic compound and nutrient content such as nitrogen, phosphorous and potassium, which result from the elimination of a great percentage of the water contained in the sludge. This nutrient content can be raised to a total of 6.5% if expressed as N, $P_2O_5$ and $K_2O$ (the fertilizers by definition, must contain 20% minimum of such nutrients).

Even though that with the drying process it is obtained a product having an average commercial value and that by said process it is solved the bacteriological pollution problem, the fuel consume used to generate the heat needed by the drying process, represents a high cost. Therefore, said process requires a high investment cost and has a very high operation cost, which make the process unprofitable for treating low quantities of sludge.

d) Sludge Incineration

The sludge incineration process, has some advantages when compared with the sludge drying process, due to the fact that during the incineration, it is used the combustion heat of the organic matter contained in the sludge, thus decreasing the energy consumption and furthermore, the air volumes to be heated and moved are significantly smaller which constitute an additional energy consumption decrease.

The main disadvantages of the sludge incineration process are related with the drying of the sludge, mainly because of the following problems: the investment, operation and maintenance costs of the incineration step are higher than the costs of the drying step, furthermore, the incineration process is highly pollutant to the environment, because the gaseous effluents produced by the incinerator are very acidic, and contain very toxic metallic compounds such as lead, arsenic, cadmium and mercury (normally present in the urban wastewater), which are considered as very dangerous for the environment and for the health of humans and animals. Additionally, the disposition of the ashes generated by the incinerator and recollected in the ash separator, have the same polluting agents as the gaseous effluents and therefore the use of said ashes for the production of cement for example, is very restrained.

e) Sludge Drying Beds

Drying beds are the most widely used method of sludge dewatering in the United States. Sludge drying beds are typically used to dewater digested sludge. After drying, the sludge is removed and either disposed of in a land fill. The most commonly used type of dry bed is the sand drying beds, which are generally used for small and medium-sized communities. In a typical sand drying bed, sludge is placed on the bed in a 20 to 30 cm layer and allowed to dry. Although the principal advantage of the drying bed is its low cost, there are highly pollutant to the environment and the dry product can not be used due to its high content of polluting agents such as bacteria and viruses.

d) Lime Stabilization

In the lime stabilization process, lime is added to untreated sludge in sufficient quantity to raise the pH to 12 or higher. The pH creates an environment that is not conductive to the survival of microorganisms. Consequently, the sludge will not putrefy or create odors so long the as the pH is maintained at this level. However, lime stabilization does not destroy the organics necessary for bacterial growth. Therefore the sludge can not be used and must be treated with an excess of lime or disposed of before the pH drops significantly.

e) Ocean Disposal

The ocean disposal is highly pollutant and therefore less and less accepted by the governments.

e) Other Processes

Some investigators have studied and developed some other new processes by which there are obtained interesting results. For example by mixing the sludge with construction cement powder and processing the mix inside a granulation machine, it can be obtained granules of fertilizer useful for certain acidic soils such as those predominating in Europe or at the coasts of the Mexican Gulf.

In order to solve the above referred problems, applicants developed a process for the treatment of sludge which do not produce toxic residues and has low investment and operation costs.

The process according with the present invention comprises the steps of: mixing the sludge with sulphuric acid; feeding the mix to a granulator machine; adding sulphuric acid and anhydrous ammonium to the mix inside the granulator in order to produce an exothermic reaction between the sulphuric acid and the anhydrous ammonia which produces sufficient heat to evaporate the water contained in the sludge and to eliminate all the pathogen and non pathogen microorganisms; adjusting the amount of sulphuric acid and anhydrous ammonium that is added to the granulator in order to obtain a final dry product having a pH of between about 1.0 and 5.0 and having an humidity of 3.5% maximum by testing the acidity and humidity of a sample of the dry product at an exit outlet of the granulator; sieving the dry product in order to separate the product particles in three parts: a first part comprising particles having a normal size of 96% by weight of between 4 to 18 mesh screen, a second part comprising particles having a size below normal, and a third part comprising particles having a size above normal; and recovering the final product particles having normal size;

The process of the present invention, uses the heat produced by the reaction between the sulphuric acid and ammonia for the transformation of the sludge on a nitrogenous fertilizer having a minimum content of nitrogen of 18%, by which it is avoided the use of a burner and the related fuel consume.

The heat produced by the above referred reaction is sufficient for the evaporation of the water contained in the sludge and for the elimination of all the pathogen and non pathogen microorganism, producing a dry product having a low pH, free of polluting agents and a high commercial value.

Furthermore, the investment on installing a plant for the operation of the process of the present invention is lower than processes such as the sludge incineration processes which do not generates commercial products. And the investment cost is recoverable in function of the total sales of the fertilizer produced by the process of the present invention.

Finally, the process of the present invention can be used also to treat hen droppings and guano.

SUMMARY OF THE INVENTION

It is therefore a main objective of the present invention, to provide a process for the treatment of sludge generated by wastewater process treatments, which uses the heat produced by the reaction between the sulphuric acid and ammonium to evaporate the water of the sludge.

It is also a main objective of the present invention, to provide a process for the treatment of sludge of the above disclosed nature by which all the pathogen microorganisms contained in the sludge are eliminated.

It is another objective of the present invention, to provide a process for the treatment of sludge of the above disclosed nature, in which the investment and maintenance cost are lower than other processes for the treatment of sludge.

It is also a main objective of the present invention, to provide a process for the treatment of sludge of the above disclosed nature, which produce a fertilizer having a high commercial value.

It is still another objective of the present invention to provide a process for the treatment of sludge of the above disclosed nature, by which it is avoided the use of a burner and the related fuel consume.

It is still a main objective of the present invention, to provide a process for the treatment of sludge of the above disclosed nature, which do not produce toxic residues.

It is another objective of the present invention to provide a process for the treatment of sludge of the above disclosed nature, which can be used to treat also hen droppings and guano.

These and other objects and advantages of the, process for the treatment of sludge of the present invention will become apparent to those persons having an ordinary skill in the art, from the following detailed description of the invention.

Figure 1:
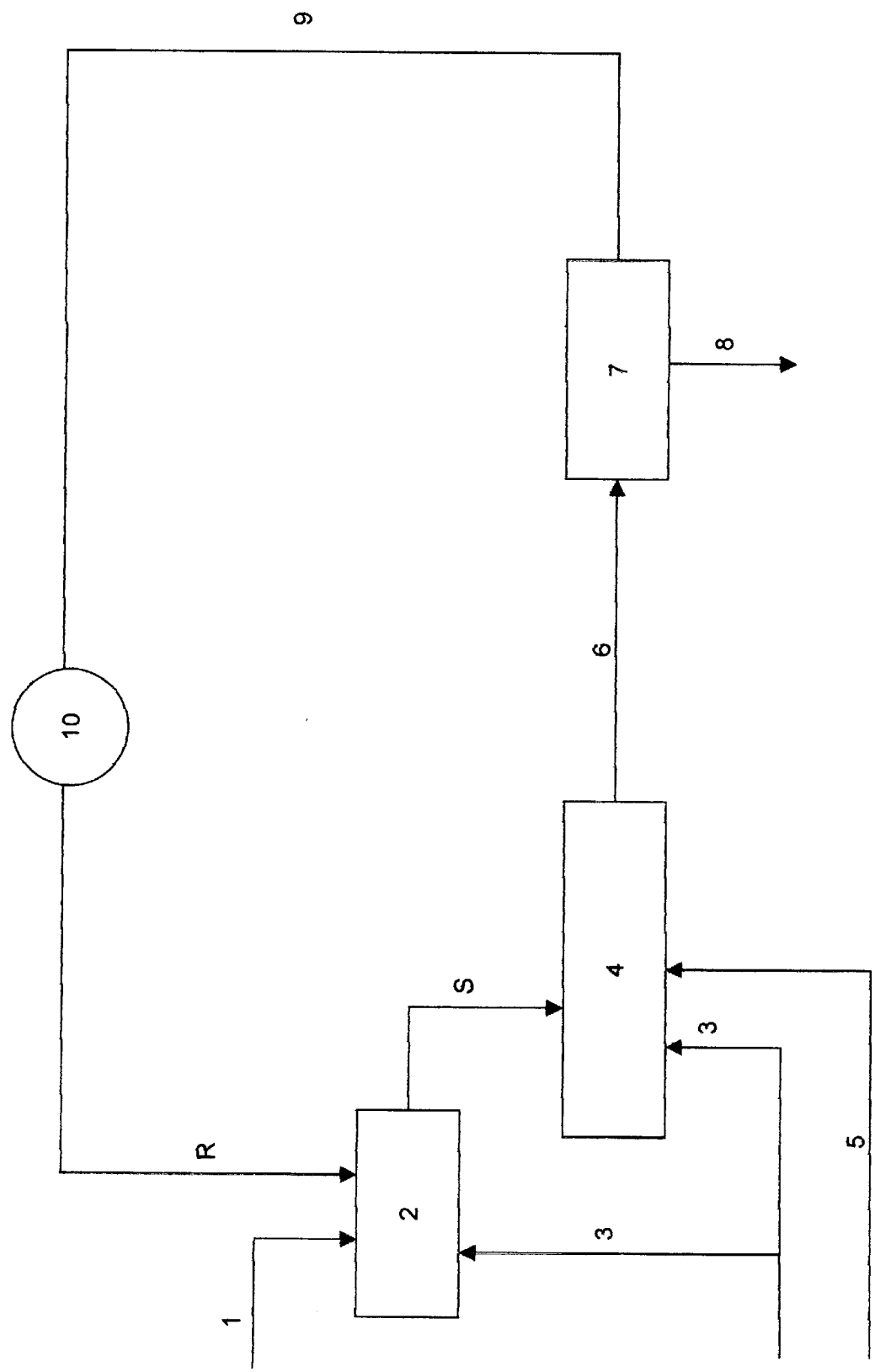
FIG. 1 is a diagram of the process in accordance with the present invention.

DETAILED DESCRIPTION OF THE INVENTION.

The process for the treatment of sludge of the present invention will be now described referring to a preferred embodiment thereof illustrated in the accompanying drawing, wherein the same signs and numbers, refer to the same parts of the shown figures, said process comprising the steps of:

a) Mixing sludge "1" produced by wastewater treatment processes having a water content of 80% and a solid content of 20% with sulphuric acid "3", recycled particles "R" from the step d) of this process containing ammonium sulphate from a last step of this process in a mixer "2", until obtain a sludge "S" having a stiff consistence.

b) feeding the sludge "S" to a granulator machine "4" comprising a rotary drum, in which it is added two parts of anhydrous ammonia "5" by each part of sulphuric acid "3", considering that it has to be added 74.21 tons of sulphuric acid "3" at a concentration of 100% by each 100 tons of sludge "1", in order to react the sulphuric acid "3" with the anhydrous ammonia "5" and obtain ammonium sulphate in accordance with the following exothermic reaction:

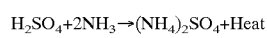

The heat produced by the above referred reaction heats the sludge "S" inside the granulator "4" to a temperature of between about 98° C. to 108° C., sufficient to evaporate 1.15 tons of water by each ton of sulphuric acid "3" added to the sludge "S".

The ammonium sulphate contained in the recycled particles "R" added at the step a) is converted on ammonium bisulphate, which has a lower fusion point that optimizes the granulation process.

c) adjusting the amount of sulphuric acid "3" and anhydrous ammonia "5" that is added to the granulator "4" in order to obtain a dry product "6", having a pH of between about 1.0 and 5.0 and having an humidity of 3.5% maximum by testing the acidity and humidity of the dry product "6" at an exit outlet of the granulator "4" and adding more sulphuric acid "3" if the humidity is greater than 3.5% and more anhydrous ammonia "5" in order to maintain the pH, and adding less sulphuric acid "3" if the humidity is lesser than 3.5% in order to avoid an overheating of the sludge "S" on process and avoid the burning of the organic matter contained in the sludge "S" on processing.

d) sieving the final dry product by means of a sieving machine "7" in order to separate the dry product particles in three parts: a first part comprising particles constituting the final product "8" having a normal size of 96% by weight of between 4 to 18 mesh screen, a second part comprising particles having a size below and above normal size "9". The particles having sizes below and above the normal size "9" are powdered by means of a grinding machine "10" and recycled "R" to the granulator "4" in order to resize the particles to a normal size.

In order to avoid great variations on the dry sludge particle size and thus reduce the amount of the particles to be recycled to the granulator "4", it can be added additives selected from the group consisting of ureaform and calcium carbonate.

This additive achieve its maximum hardness at a pH of between 1.0 to 5.0, thus giving a good strength to the final product "8". The ureaform can be added in proportions of 2.0 to 15% dry basis, to the dry sludge.

It is also possible to increase the nitrogen content of the final product "8" by adding ureaform. For example, in order to increase the nitrogen content to a 20% it has to be added 7.5% of ureaform.

By other hand, in order to decrease the amount of sulphuric acid "3" and anhydrous ammonia "5" added to the granulator "4" by decreasing in advance the volume of part of the water contained in the sludge "1", and thus decreasing the operation costs, it can be added calcium carbonate to the granulator "4" which reacts with part of the sulphuric acid "3" and forms calcium sulphate which has the property of adsorb water in order to acquire hardness, increasing the hardness of the dry sludge particles "6" and reducing the dispersion of the particle size.

It can be added also simple superphosphate as an additive, which contains between about 60% to 65% of gypsum and 20% of phosphorous expressed as $P_2O_5$.

With the process of the present invention it can be obtained a dry granulated product free of biological polluting compounds enriched with approximately: 82% of ammonium sulphate, 18% of organic matter, form 18% to 21% of nitrogen and other nutrients such as sulphur and calcium in small amounts and having particles of good hardness and a low dispersion of the particle size.

Furthermore, the process of the present invention also can be used to treat hen droppings or guano.

Finally it must be understood that the process for treating sludge of the present invention, is not limited exclusively to the above described and illustrated embodiments and that the persons having ordinary skill in the art can, with the teaching provided by this invention, make modifications to the process for treating sludge of the present invention, which will clearly be within the true inventive concept and scope of the invention which is claimed in the following claims:

We claim:

1. A process for treating sludge having a water content of approximately 80% and a solid content of approximately 20% for obtaining a dry particulate product free of biologically polluting agents useful as a fertilizer, which comprises the steps of:

a) mixing the sludge with acid until a sludge having a stiff consistency is obtained;

b) feeding the mix obtained in step a) to a granulator machine;

c) adding sulfuric acid and anhydrous ammonia to the mix in order to produce an exothermic reaction between the sulfuric acid and the anhydrous ammonia which produces sufficient heat to evaporate the water contained in the sludge and to eliminate all the pathogenic and non-pathogenic microorganisms;

d) adjusting the quantity of sulfuric acid and anhydrous ammonia added to the granulator to obtain a final dry sludge particulate product having a pH of between about 1.0 and 5.0 and having a maximum humidity of 3.5% by measuring the acidity and humidity of a sample of dry product taken from inside the granulator;

e) sieving the dry product in order to separate the dry particulate product into three parts: a first part comprising particles having a normal size of between 4 to 18 mesh screen, a second part comprising particles having a size below the normal size and a third part comprising particles having a size above the normal size;

f) recovering the dry particulate product having normal size;

g) recycling the particles having a size below and a size above the normal size to step a) in order to be resized, wherein the particles below and above the normal size are powdered before being recycled to the step a).

2. The process as claimed in claim 1, wherein step a) is carried out by a mixer.

3. The process as claimed in claim 1, wherein the particles to be recycled in step g) contain ammonium sulfate which is transformed to ammonium bisulfate in step c).

4. The process as claimed in claim 1, wherein the granulator machine of step b) comprises a rotary drum.

5. The process as claimed in claim 1, wherein the sulfuric acid and anhydrous ammonium added in step c), are added in a proportion of two parts anhydrous ammonia to each part of sulfuric acid.

6. The process as claimed in claim 1, wherein step d) is carried out by adding more sulfuric acid to the granulator if the humidity is greater than 3.5% and more anhydrous ammonia to maintain the pH, and adding less sulfuric acid if the humidity is less than 3.5% to avoid overheating of the sludge and avoiding the burning of organic matter contained in the sludge.

7. The process as claimed in claim 1, further comprising the addition of ureaform in step a) to provide approximately the same particle size to all the dry particulate product particles and to increase the hardness of the dry sludge particles.

8. The process as claimed in claim 1, further comprising the addition of calcium carbonate in step a) which reacts with a part of the sulfuric acid and forms calcium sulphate which adsorbs water thus acquiring hardness and increasing the hardness of the dry sludge product particles and providing approximately the same particle size to the entire dry particulate product.

9. The process as claimed in claim 1, further comprising the addition of a superphosphate in step a).

10. The process as claimed in claim 1, wherein a dry granulated product comprising particles having approximately the same particle size and which are free of biological polluting compounds enriched with approximately 82% of ammonium sulfate, 18% of organic matter, and from 18% to 21% of nitrogen is obtained.

11. The process as claimed in claim 1, wherein a dry granulated product comprising particles having approximately the same particle size and which are free of biological polluting compounds enriched with approximately 82% of ammonium sulphate, 18% of organic matter, from 18% to 21% of nitrogen and sulfur and calcium is obtained.

12. The process as claimed in claim 1, wherein the sludge is generated by a wastewater treatment process.

13. The process as claimed in claim 1, wherein the sludge comprises hen droppings.

14. The process as claimed in claim 1, wherein the sludge comprises guano.

* * * * *